Patented June 9, 1953

2,641,600

UNITED STATES PATENT OFFICE 2,641,600

ALKENYLATION OF FURANS

Arthur A. Harban, Lansing, Ill., and Carl E. Johnson, Griffith, Ind., assignors to Standard Oil Company, Chicago, Ill., a corporation of Indiana No Drawing. Application November 30, 1950, Serial No. 198,482

8 Claims. (Cl. 260—346.1)

This invention relates to a process for alkenylating furan and derivatives thereof that contain a replaceable alpha hydrogen.

Copending application Serial No. 64,915, filed December 11, 1948, now U. S. Patent No. 2,564,077, issued August 14, 1951, discloses and claims the employment of alkanesulfonic acids in effecting the alkenylation of aromatic hydrocarbons in the presence of alkanesulfonic acids as a catalyst. The relative availability of furan and the activity of its alkenylated derivatives make desirable the preparation of the latter. It was found, however, that attempts to alkenylate furan by the relatively simple process of the said copending application were entirely unsuccessful, and that, although furan may show some of the characteristics of aromaticity, it is not susceptible to direct alkenylation. Alkenyl derivatives have in the past been prepared by such relatively expensive and multi-stage procedures as the Grignard reaction, cf. Chelintzev; Bull. Soc. Chim. (5), 4, 819–24 (1937).

An object of the present invention is the provision of a direct and simple process for the alkenylation of furans and derivatives thereof. The invention has for other objects such other advantages or results as will appear in the following specification and claims.

It was found that when it was attempted to alkenylate furan with a conjugated diolefin in the presence of an alkanesulfonic acid only an extremely heavy sludge or light solid was formed and no alkenyl furan was obtained. This was found to be true even if the furan and conjugated diolefins were premixed and cooled to a temperature as low as $-30°$ C. before reaction and even though this temperature was maintained during addition of the acid. Even the so-formed solid was unstable and when it was permitted to warm to room temperature it decomposed rapidly with the evolution of heat and white fumes and deposition of black coke-like material.

We now have found that furan can be directly alkenylated if, in combination with an alkanesulfonic acid catalyst, there is employed an ether-type compound or organic oxide selected from the group consisting of dioxane, alpha-pyrone, tetrahydrofuran and diethyl, dipropyl and dibutyl ether. These compounds form stable oxonium-salt complexes with alkanesulfonic acids. This reaction can be carried out conveniently within the range of $-40°$ to $60°$ C. and preferably at temperatures between about $-15°$ and $20°$ C., either at atmospheric or higher pressure.

The employment of alkanesulfonic acids as the catalyst in this instance in a complex formed with one of the said ether-type compounds avoids not only a polymerization of the employed conjugated diolefins which is observed and is to be expected when other strong acid condensation catalysts are employed but it also avoids excessive decomposition or polymerization of the furan. Furan is known to be chemically relatively stable and consequently catalytic agents of a strength effective to introduce a substituent for hydrogen on the ring would be expected to cause decomposition and polymerization of the furan.

The employment of alkanesulfonic acids having at most five carbon atoms per molecule provides an ease of separation of catalysts from the resulting alkenylated oils inasmuch as these acids are preferentially water soluble. Thus we can employ methane-, ethane, 1-propane-, 2-propane, 1-butane, 2-butane-, 2-methyl-2-propane- or butane-sulfonic acids or mixtures thereof, e. g., a commercially available mixture of $C_1$–$C_4$ alkanesulfonic acids. Higher alkanesulfonic acids, aromatic sulfonic acids, aryl alkyl and cyclo alkyl sulfonic acids such as cyclohexane sulfonic acids may also be employed but they are not the full equivalents of the lower alkanesulfonic acids.

Diolefins particularly suitable in the present reaction include conjugated diolefins having from two to about twelve carbon atoms per molecule such for example, as 1,3-butadiene, isoprene, piperylene, 2,3-dimethyl dibutadiene, cyclopentadiene, methyl cyclopentadiene, 1,3-cyclohexadiene and 2,cyclo-1,3-butadiene. Different temperatures within the given temperature range are optimum for different olefins; for example butadiene requires a higher temperature than isoprene to effect the alkenylation of furan.

The furan compounds include furan, $C_4H_4O$, or alkylated, alkenylated or otherwise substituted furans such as sylvan, or methyl furan, $C_5H_6O$ that have a hydrogen atom at the alpha position on the ring. Preferably a molar excess of furan or furan derivatives is employed. A molar excess of furan does not provide predominantly difuryl alkanes by the reaction with diolefins, as might be expected, but rather the monoalkenyl furan is produced in predominant yields.

In carrying out the reaction, the sulfonic acid-complex catalyst and the olefin must not be mixed in the absence of the furan compound; either the furan and olefin can be mixed and the catalyst be added, or the catalyst and the furan can be mixed and the olefin be added. Contact of the diolefin and the catalyst complex before admixture with the furan reactant will cause polymerization and decomposition of the olefin. In a preferred manner of carrying out the invention, the catalyst, consisting of the reaction product or complex of alkanesulfonic acid and, preferably, dioxane, is admixed with furan and then with the selected diolefin. When the furan compound and the catalyst are first mixed together, the diolefin is slowly added to the stirred mixture while the same is cooled to remove exothermic heat of reaction. In one alternative method, in which a mixture of the furan compound and the conjugated diolefin is first prepared and the catalyst complex is slowly added to the mixture, additional care must be taken to refrigerate the reaction mass. The olefin and the catalyst-complex can also be added simultaneously to the furan compound.

Although the process can be effectively operated at atmospheric pressure, it is preferred to employ mild superatmospheric pressure, particularly when operating in the upper portion of the operating temperature range hereinabove set forth. Superatmospheric pressures are employed to ensure liquid phase reaction, particularly when the diolefin is of low molecular weight, for example, butadiene.

The reaction appears to be substantially instantaneous but it is necessary to add the diolefin slowly enough to avoid developing excessive temperatures. Thus reaction can be completed within less than about 20 minutes, but if the cooling capacity is limited, a reaction period of one-half to three hours can be employed.

The sulfonic acid-oxonium salt complex is formed by reacting approximately an equimolar quantity, and preferably a slight excess, of a selected oxygenated compound with a sulfonic acid. At least about 0.02 mol of sulfonic acid (in the form of its oxonium-salt-complex) per mol of reactant furan should be employed to catalyze the alkenylation reaction. Although a top limit of catalyst concentration is not of critical importance, at concentrations higher than about one mol of catalyst per mol of furan undesirable side reactions, especially polymerization, may be encountered. Upon the bases of reaction facility and process efficiency, 0.1 to 0.4 mol of the sulfonic acid complex per mol of furan constitutes a preferred range of catalyst concentration.

The following specific examples are illustrative of the alkenylation process.

Example 1

A catalyst composed of 0.295 mol of mixed alkanesulfonic acid and 0.334 mol of dioxane were admixed with 1.47 mols of furan and the mixture was charged to a stirred reaction flask. The reactants in the flask were cooled to a temperature of 0° to 4° C. and were maintained at that temperature during the addition of 0.7 mol of isoprene over a period of about 10 minutes. The mixture was stirred an additional 85 minutes and then poured on cracked ice. The product was washed with caustic solution and then distilled. One distillate fraction consisted of 15.8 grams of oil boiling at 65° to 67° C. at 19.3 mm. mercury gage pressure. This oil, identified as pentenyl furan, had a density of 0.915, an index of refraction ($n_D^{20}$) of 1.4726 and a molecular weight of 136. In addition thereto 24.2 grams of a polymer of pentenyl furan was obtained.

Example 2

To a stirred mixture consisting of 0.38 mol of ethanesulfonic acid, 0.5 mol of dioxane and 2.65 mols of furan, there was added 2.5 mols of isoprene. A reaction temperature of 16° to 20° C. was maintained over a period of 1.25 hours. Analysis of the products indicated an isoprene conversion of 39.8 per cent and a yield of pentenyl furan based on the converted isoprene of 26.2 per cent.

Example 3

In this example the sulfonic acid-dioxane complex was first formed and then slowly added to a mixture of the isoprene and furan. The sulfonic acid-dioxane complex contained 0.173 mol of ethanesulfonic acid and 0.25 mol of dioxane. The mixture, to which the sulfonic acid-dioxane complex was slowly added, consisted of 1.4 mols of isoprene and 1.47 mols of furan. The sulfonic acid-dioxane complex was added for a period of over 3 hours during which time the reaction temperature was maintained at 1° C. While only a 9.6 per cent by weight conversion, based on the isoprene, was accomplished, a yield of pentenyl furan of 54.5 per cent based on the converted isoprene was obtained, thus indicating a typical situation best adapted to the use of a high recycle ratio in order to provide high yields of pentenyl furan and to avoid excessive polymerization or decomposition thereof.

Example 4

In this example, a considerable excess of catalyst complex was employed. The catalyst, comprising 1.13 mols of ethanesulfonic acid and 1.7 mols of dioxane was added, over a period of 45 minutes, to a mixture comprising 1.13 mols each of isoprene and furan. The reaction temperature during addition was maintained at −15° C., such lower temperatures being preferred when high catalyst concentrations are employed. The reaction mass was permitted to warm to a temperature between 0° and 4° C. and was held at this temperature for one hour. A conversion of 26.8 per cent by weight based on the isoprene was obtained and of this converted isoprene, a yield of 32.7 per cent by weight of the pentenyl furan was recovered.

Example 5

Methyl furan can be alkenylated in a manner similar to that employed in the above examples. One mol of methyl furan is admixed with a catalyst complex consisting of about 0.4 mols of ethanesulfonic acid and a molar equivalent of dioxane. While stirring this mixture, isoprene is slowly added thereto over a period of about 30 minutes and the reaction temperature is maintained at about room temperature. The reaction mass is permitted to stand for about a half hour and a pentenyl methyl furan is thereafter recovered from the reaction products.

Having described our invention, we claim:

1. The process of preparing an alkenyl furan that comprises reacting a furan compound, having an unsubstituted alpha hydrogen, with a conjugated diolefin having between four and about twelve carbon atoms per molecule at a temperature between about −30° and 60° C. in the presence of at least about 0.02 mol of non-olefinic hydrocarbon sulfonic acid, per mol of the selected furan compound, in the form of a sulfonic acid-oxonium salt complex catalyst, that is stable under reaction conditions and is formed by mixing a non-olefinic hydrocarbon sulfonic acid having at most five carbon atoms per molecule with a saturated ether compound that is capable of forming a complex with the sulfonic acid.

2. The process of claim 1 in which the selected furan compound is furan.

3. The process of claim 1 in which the conjugated diolefin is isoprene.

4. The process of claim 1 in which the ether compound is dioxane.

5. The process of preparing an alkenyl furan that comprises admixing a furan compound having an unsubstituted alpha hydrogen and between 0.1 and 0.4 mol, per mol of the furan compound, of a dioxane-sulfonic acid addition product of which the acid contains at most five carbon atoms per molecule and slowly adding thereto a conjugated diolefin having between four and about twelve carbon atoms per molecule while maintaining the temperature of the admixture between about −30° and 60° C., thereby effecting reaction between the said furan compound and conjugated diolefin, and recovering an alkenyl furan compound from the reaction product.

6. A process of making an alkenyl furan comprising admixing, in liquid phase in the presence of furan, from one-half to one mol, per mol of furan, of a conjugated diolefin having from four to about twelve carbon atoms per molecule and about 0.1 and 0.4 mol, per mol of furan, of a dioxane-alkanesulfonic acid addition compound in which the acid has at most five carbon atoms per molecule, maintaining the temperature of the admixture between −40° and 60° C. for a period between about 20 minutes and 3 hours and thereby effecting reaction between said furan and said conjugated diolefin, and thereafter distilling monoalkenyl furan from the reaction product.

7. A process of preparing pentenyl furan comprising the steps of admixing alkanesulfonic acid having at most five carbon atoms per molecule with about a mol equivalent of dioxane and forming a complex thereof, mixing furan and between 0.1 and 0.4 mol of the said complex, per mol of the furan, agitating the mixture and slowly adding thereto from one-half to about one mol of isoprene per mol of furan to the furan acid-complex mixture while maintaining the temperature of the mixture between about −15° and +20° C., maintaining the said temperature for a period of between about 20 minutes and 3 hours and effecting reaction between the furan and isoprene to form pentenyl furan, and distilling the pentenyl furan from the reaction mixture.

8. The process of preparing an alkenyl furan that comprises reacting a furan compound, having an unsubstituted alpha hydrogen, with a conjugated diolefin having between four and about twelve carbon atoms per molecule at a temperature between about −30° and 60° C. in the presence of at least about 0.02 mol of an alkanesulfonic acid, per mol of furan compound, in the form of an alkanesulfonic acid-oxonium salt complex catalyst, that is stable under reaction conditions and is formed by mixing an alkanesulfonic acid having at most five carbon atoms per molecule with an ether compound that is selected from the group consisting of dioxane, alpha-pyrone, tetrahydro furan, diethyl ether, dipropyl ether, and dibutyl ether.

ARTHUR A. HARBAN.
CARL E. JOHNSON.

References Cited in the file of this patent

UNITED STATES PATENTS

| Number | Name | Date |
|---|---|---|
| 2,267,737 | Ipatieff et al. | Dec. 30, 1941 |
| 2,483,903 | Herbolsheimer | Oct. 4, 1949 |